(12) United States Patent
Chen et al.

(10) Patent No.: US 10,177,924 B1
(45) Date of Patent: Jan. 8, 2019

(54) PHYSICALLY UNCLONABLE FUNCTION UNIT WITH ONE SINGLE ANTI-FUSE TRANSISTOR

(71) Applicant: eMemory Technology Inc., Hsin-Chu (TW)

(72) Inventors: Hsin-Ming Chen, Hsinchu (TW); Meng-Yi Wu, Hsinchu County (TW); Po-Hao Huang, Hsinchu (TW)

(73) Assignee: eMemory Technology Inc., Hsin-Chu (TW)

( * ) Notice: Subject to any disclaimer, the term of this patent is extended or adjusted under 35 U.S.C. 154(b) by 0 days.

(21) Appl. No.: 16/038,143

(22) Filed: Jul. 17, 2018

Related U.S. Application Data

(60) Provisional application No. 62/557,170, filed on Sep. 12, 2017.

(51) Int. Cl.
*H03K 19/00* (2006.01)
*H04L 9/32* (2006.01)
*G11C 7/06* (2006.01)
*G11C 17/16* (2006.01)

(52) U.S. Cl.
CPC ............ *H04L 9/3278* (2013.01); *G11C 7/062* (2013.01); *G11C 17/16* (2013.01)

(58) Field of Classification Search
CPC ........ H04L 9/3278; G11C 17/16; G11C 7/062

USPC ............................................................. 326/8
See application file for complete search history.

(56) References Cited

U.S. PATENT DOCUMENTS

| | | | | |
|---|---|---|---|---|
| 9,196,377 B1* | 11/2015 | Park | ................ | H01L 27/11206 |
| 10,032,521 B2* | 7/2018 | Grigoriev | ................ | G11C 7/24 |
| 2005/0207223 A1* | 9/2005 | Taheri | ...................... | G11C 7/20 365/185.08 |
| 2010/0220511 A1* | 9/2010 | Kurjanowicz | ......... | G11C 17/16 365/96 |
| 2013/0308365 A1* | 11/2013 | Smith | .................... | G11C 17/18 365/96 |
| 2016/0329897 A1* | 11/2016 | Gu | ................. | H03K 19/017509 |
| 2018/0096172 A1* | 4/2018 | Lu | ........................... | G06F 21/86 |
| 2018/0205563 A1* | 7/2018 | Takaoka | ............... | H04L 9/3278 |

* cited by examiner

*Primary Examiner* — Don Le
(74) *Attorney, Agent, or Firm* — Winston Hsu

(57) ABSTRACT

A physically unclonable function unit includes and anti-fuse transistor and a control circuit. The anti-fuse transistor has a first terminal, a second terminal, and a gate terminal. The control circuit is coupled to the anti-fuse transistor. During an enroll operation, the control circuit applies an enroll voltage to the gate terminal of the anti-fuse transistor and applies a reference voltage to the first terminal and the second terminal of the anti-fuse transistor. The enroll voltage is higher than the reference voltage, and is high enough to create a rupture path on the gate terminal to the first terminal or to the second terminal.

15 Claims, 5 Drawing Sheets

PHYSICALLY UNCLONABLE FUNCTION UNIT WITH ONE SINGLE ANTI-FUSE TRANSISTOR

CROSS REFERENCE TO RELATED APPLICATIONS

This non-provisional application claims priority of U.S. provisional application 62/557,170, filed on Sep. 12, 2017, included herein by reference in its entirety.

BACKGROUND OF THE INVENTION

1. Field of the Invention

The present invention is related to a physically unclonable function unit, and more particularly, to a physically unclonable function unit with one single anti-fuse transistor.

2. Description of the Prior Art

To enhance the safety of electronic devices, the integrated circuit physically unclonable function (PUF) may be a solution to protect the system from physical attacks and for raising the barrier for reverse engineering or system hacking due to its intrinsic characteristics. The PUF can establish a bit string pattern due to uncontrollable random physical characteristics generated in the manufacturing process. The process variations can come from very small inevitable variability in process control, material contents, and/or environmental drift. These unavoidable and unpredictable variations are amplified by the PUFs for generating unique bit strings.

In prior art, a PUF unit is usually formed with two elements featuring complementary bits so the process variation can be magnified easier. However, there are several possible ways to crack certain PUF technologies which are susceptible to the security vulnerabilities and retrieve the secrets information. For example, the passive voltage contrast inspection can be applied. That is, the adversaries can utilize the transmission electron microscope (TEM) and scanning electron microscope (SEM) facilities to apply e-beam to the two elements of the PUF unit. More specifically, if the elements use floating gates technology to store information, then the electron beams can be applied to scan the floating gates and electron detector can absorb the second electrons that are generated from the floating gate. After absorbing the secondary electrons reflected from the floating gates, a bright image would be derived if the floating gate is negatively charged, and a dark image would be derived if the floating gate has not been charged. Therefore, by comparing the images captured by the electron detectors, the secret bit information can be obtained. Therefore, even if the PUF is able to generate unpredictable bit strings, the threat to information safety still exists.

SUMMARY OF THE INVENTION

One embodiment of the present invention discloses a physically unclonable function (PUF) unit. The PUF unit includes an anti-fuse transistor and a control circuit.

The anti-fuse transistor has a first terminal, a second terminal, and a gate terminal. The control circuit is coupled to the anti-fuse transistor. During the enroll operation, the control circuit applies an enroll voltage to the gate terminal of the anti-fuse transistor and applies a reference voltage to the first terminal and the second terminal of the anti-fuse transistor. The enroll voltage is higher than the reference voltage, and is high enough to create a rupture path on the gate terminal to the first terminal or to the second terminal.

Another embodiment of the present invention discloses a method for operating a PUF unit. The PUF unit includes an anti-fuse transistor and a control circuit coupled to the anti-fuse transistor.

The method includes the control circuit applying an enroll voltage to a gate terminal of the anti-fuse transistor, and applying a reference voltage to a first terminal and a second terminal of the anti-fuse transistor during an enroll operation. The enroll voltage is higher than the reference voltage, and the enroll voltage is high enough to create a rupture path on the gate terminal to the first terminal or to the second terminal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
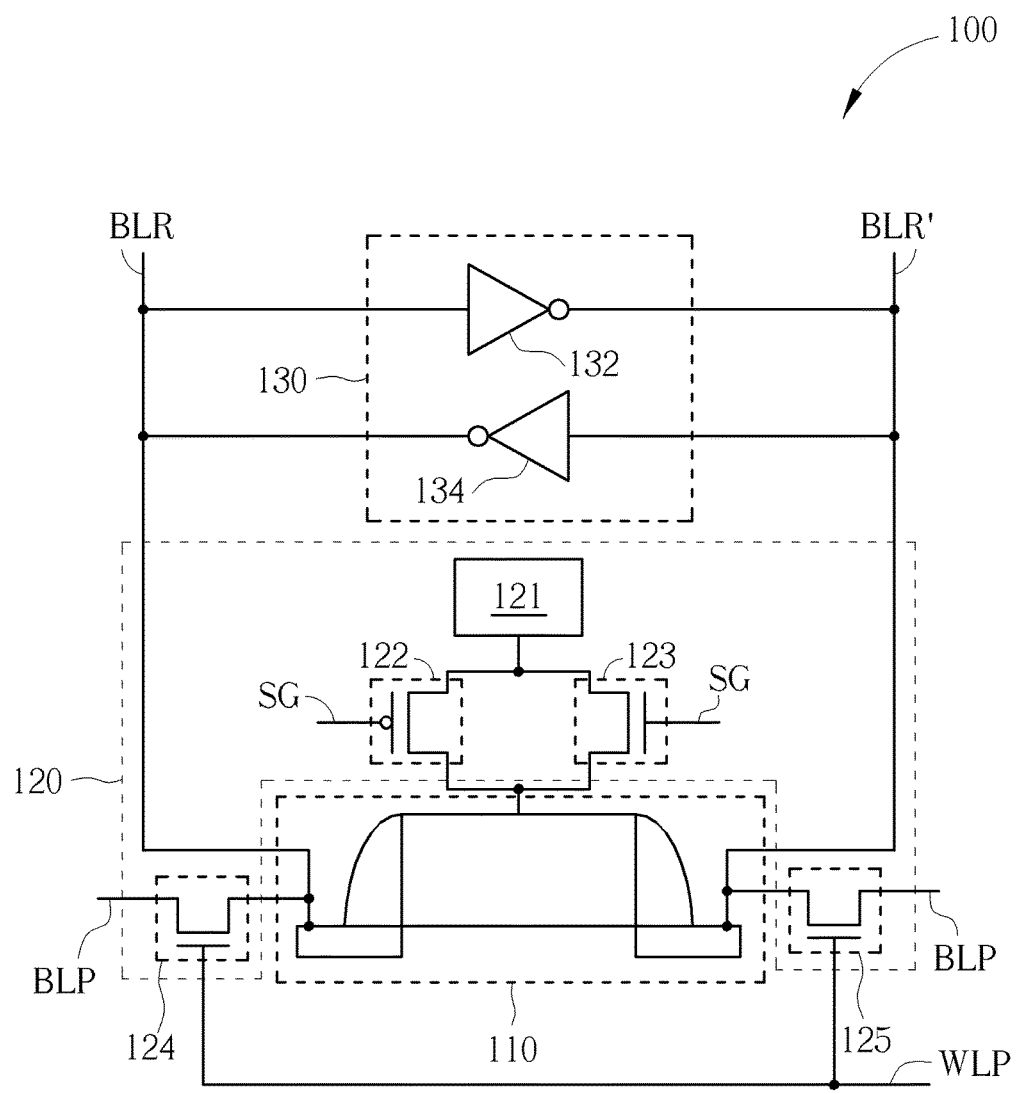
FIG. 1 shows a physically unclonable function unit according to one embodiment of the present invention.

FIG. 1 shows a physically unclonable function (PUF) unit 100 according to one embodiment of the present invention. The PUF unit includes an anti-fuse transistor 110, a control circuit 120, and a differential sensing circuit 130.

The anti-fuse transistor 110 has a first terminal, a second terminal, and a gate terminal. The first terminal and the second terminal can be the source and drain of the anti-fuse transistor 110. The control circuit 120 is coupled to the anti-fuse transistor 110. The PUF unit 100 can be used to generate the entropy bits or the random code that required by the system for security purpose. To generate the entropy bits or the random code, the PUT unit may perform an enroll operation.

Figure 2:
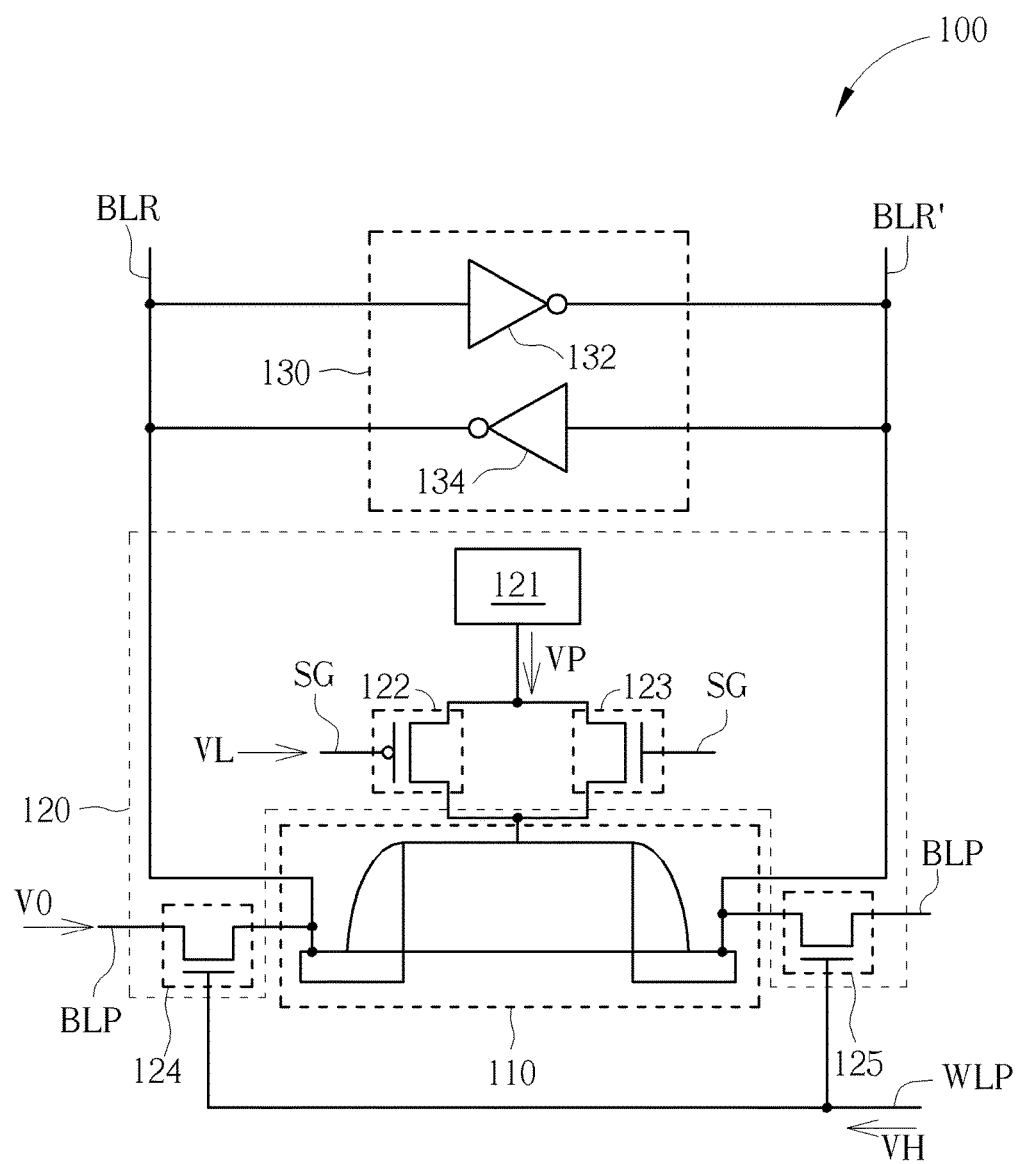
FIG. 2 shows the voltages received by the PUF unit in FIG. 1 during the enroll operation.

FIG. 2 shows the voltages received by the PUF unit 100 during the enroll operation. During the enroll operation, the control circuit 120 can apply an enroll voltage VP to the gate terminal of the anti-fuse transistor 110 and apply a reference voltage V0 to the first terminal and the second terminal of the anti-fuse transistor 110. The enroll voltage VP is higher than the reference voltage V0, and is high enough to create a rupture path on the gate terminal to the first terminal or to the second terminal. For example, the enroll voltage VP can be 6V, and the reference voltage V0 can be the system ground voltage or 0V in some embodiments.

With the large voltage gap applied to the anti-fuse transistor 110, a ruptured path with low resistance can be created on a certain portion of the oxide, depending on the localized and intrinsic characteristics of the gate oxide of the anti-fuse transistor 110 caused by manufacturing variations, such as gate oxide quality, local defects, gate oxide thinning, etc. Usually, since the discharging current will flow through the path with least resistance, the ruptured path is most likely created on the oxide between the gate terminal and the first terminal of the anti-fuse transistor 110 or between the gate terminal and the second terminal of the anti-fuse transistor 110.

If the ruptured path is created on the oxide between the gate terminal and the first terminal of the anti-fuse transistor 110, then the current will mainly flow through the ruptured path due to its low resistive intrinsic, relieving the stress endured by the oxide between the gate terminal and the second terminal of the anti-fuse transistor 110. That is, once a ruptured path has been created, the low resistive path will prevent the oxide from being ruptured again, so there would be only one ruptured path being created during the enroll process normally.

In FIG. 1, the control circuit 120 includes a voltage source 121, a P-type gate control transistor 122, an N-type gate control transistor 123, a first enroll transistor 124, and a second enroll transistor 125. The P-type gate control transistor 122 has a first terminal coupled to the voltage source 121, a second terminal coupled to the gate terminal of the anti-fuse transistor 110, and a control terminal coupled to a select gate line SG. The N-type gate control transistor 123 has a first terminal coupled to the voltage source 121, a second terminal coupled to the gate terminal of the anti-fuse transistor 110, and a control terminal coupled to the select gate line SG. The first enroll transistor 124 has a first terminal coupled to the first terminal of the anti-fuse transistor 110, a second terminal coupled to an enroll bit line BLP, and a control terminal coupled to an enroll word line WLP. The second enroll transistor 125 has a first terminal coupled to the second terminal of the anti-fuse transistor 110, a second terminal coupled to the enroll bit line BLP, and a control terminal coupled to the enroll word line WLP.

In FIG. 2, the select gate line SG is at a low operational voltage VL lower than a high operational voltage VH, the enroll bit line BLP is at the reference voltage V0, and the enroll word line WLP is at the high operational voltage VH. Also, the voltage source 121 will provide the enroll voltage VP during the enroll operation. In some embodiments, the low operation voltage VL can be the same as the reference voltage V0, and the high operational voltage VH can be higher than the reference voltage V0 but lower than the enroll voltage VP. Also, the high operational voltage VH is high enough to turn on the first enroll transistor 124 and second enroll transistor 125.

In this case, the P-type gate control transistor 122 will be turned on so the gate terminal of the anti-fuse transistor 110 will receive the enroll voltage VP through the P-type gate control transistor 122. Furthermore, the first enroll transistor 124 and the second enroll transistor 125 are turned on so the first terminal and the second terminal of the anti-fuse transistor 110 will receive the reference voltage V0 from the enroll bit line BLP. Consequently, the large voltage applied to the anti-fuse transistor 110 will create a rupture path on the oxide either between the first terminal and the gate terminal of the anti-fuse transistor 110 or between the second terminal and the gate terminal of the anti-fuse transistor 110. That is, the each PUF unit 100 can generate unique rupture path during the enroll operation.

In FIG. 1, the differential sensing circuit 130 includes a first inverter 132 and a second inverter 134. The first inverter 132 has an input terminal coupled to the first terminal of the anti-fuse transistor 110 through a first read bit line BLR, and an output terminal coupled to the second terminal of the anti-fuse transistor 110 through a second read bit line BLR'. The second inverter 134 has an input terminal coupled to the output terminal of the first inverter 132, and an output terminal coupled to the input terminal of the first inverter 132. That is, the differential sensing circuit 130 can be seen as a self-feedback latch.

Figure 3:
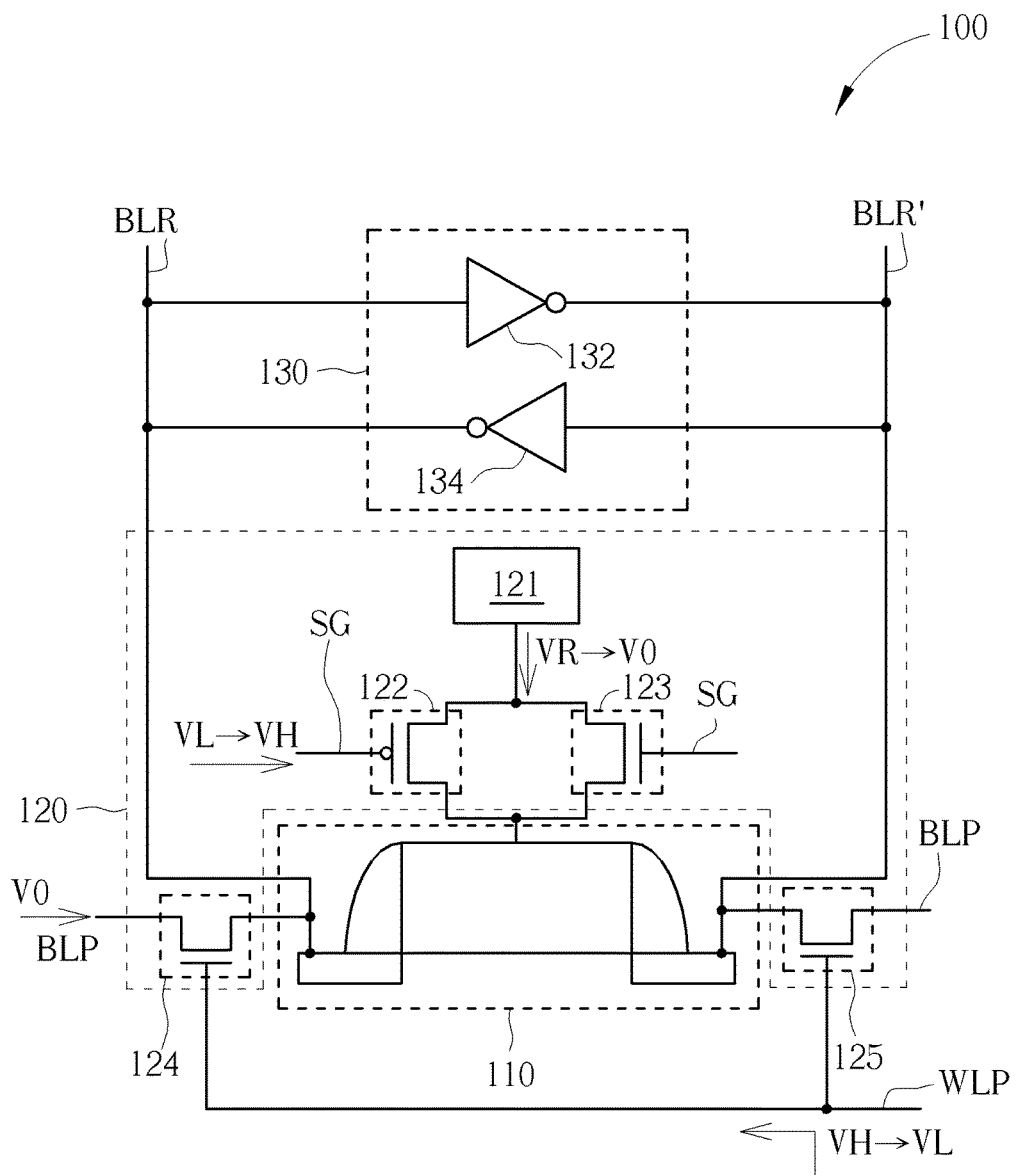
FIG. 3 shows the voltages received by the PUF unit in FIG. 1 during the random code access operation.

FIG. 3 shows the voltages received by the PUF unit 100 during the read operation. In FIG. 3, during the read operation, the select gate line SG is changed from a low operational voltage VL to a high operational voltage VH, the enroll bit line BLP is at the reference voltage V0, and the enroll word line WLP is changed from the high operational voltage VH to the low operational voltage VL. Also, the voltage source 121 will provide the read voltage VR during the read operation.

In some embodiments, the read voltage VR is lower than the enroll voltage VP, and is not high enough to rupture the oxide of the anti-fuse transistor 110. For example, the enroll voltage VP can be 6V, and the read voltage VR may be 2V. Also, the read voltage VR can be higher than the high operational voltage VH. Therefore, the P-type gate control transistor 122 will be turned on so the gate terminal of the anti-fuse transistor 110 will receive the read voltage VR through the P-type gate control transistor 122. Furthermore, the first enroll transistor 124 and the second enroll transistor 125 are turned on initially during the read operation so the first terminal and the second terminal of the anti-fuse transistor 110 will receive the reference voltage V0 first. In this case, if the ruptured path is created on the oxide between the first terminal and the gate terminal of the anti-fuse transistor 110, most of the current will flow through the ruptured path to the first terminal of the anti-fuse transistor 110.

Later, the enroll word line WLP is changed from the high operational voltage VH to the low operational voltage VL, and the first enroll transistor 124 and the second enroll transistor 125 are turned off. Therefore, the current flowing through the first terminal of the anti-fuse transistor 110 will start to charge the first read bit line BLR, causing different voltages on the first read bit line BLR and the second read bit line BLR'. Consequently, the differential sensing circuit 130 is triggered, and the small voltage difference caused by the charging current will be magnified, and the bit information stored in the anti-fuse transistor 110 can be read out quickly and steady.

Furthermore, since the differential sense circuit 130 is used to sense and magnify small voltage differences, to keep charging the bit lines is unnecessary, and may even disturb the operation of the differential sense circuit 130. Therefore, after the enroll word line WLP is changed from the high operational voltage VH to the low operational voltage VL, the voltage difference between the bit lines BLR and BLR' caused by the current generated from the anti-fuse transistor 110 will become stable. In this case, the select gate line SG will be changed from the low operational voltage VL to the high operational voltage VH and the voltage source 121 can change from providing the read voltage VR to providing the reference voltage V0. That is, the P-type gate control transistor 122 will be turned off and the N-type gate control transistor 123 will be turned on. Therefore, the anti-fuse transistor 110 will stop generating current, and the differential sense circuit 130 will output the entropy bit by magnifying and latching the voltage difference.

Since the entropy bit stored in the PUF unit 100 are represented by the oxide condition of one single anti-fuse transistor 110, the hacking approaches, such as voltage contrast by TEM or SEM inspection and gate scanning through the nano-probing, used in the prior art are not effective anymore. For example, when applying detecting voltages to the terminals of the anti-fuse transistor 110 with nano-probes, the current flowing through the ruptured path to one terminal will also appear at another terminal through the channel turn on. That is, it is very hard to distinguish the oxide rupture path in between the first terminal and the gate terminal of the anti-fuse transistor 110 or in between the second terminal and the gate terminal of the anti-fuse transistor 110. Furthermore, with the error generated during the detection or inspection, it would be even more difficult to retrieve the secret bit information stored in the PUF unit 100 with voltage contrast inspection. Also, the gate scanning is not able to identify the location of the ruptured path, and thus, is not able to retrieve the bit stored in the PUF unit 100. That is, the PUF unit 100 is able to generate entropy bit required by the system in an even more safe and secure way.

Figure 4:
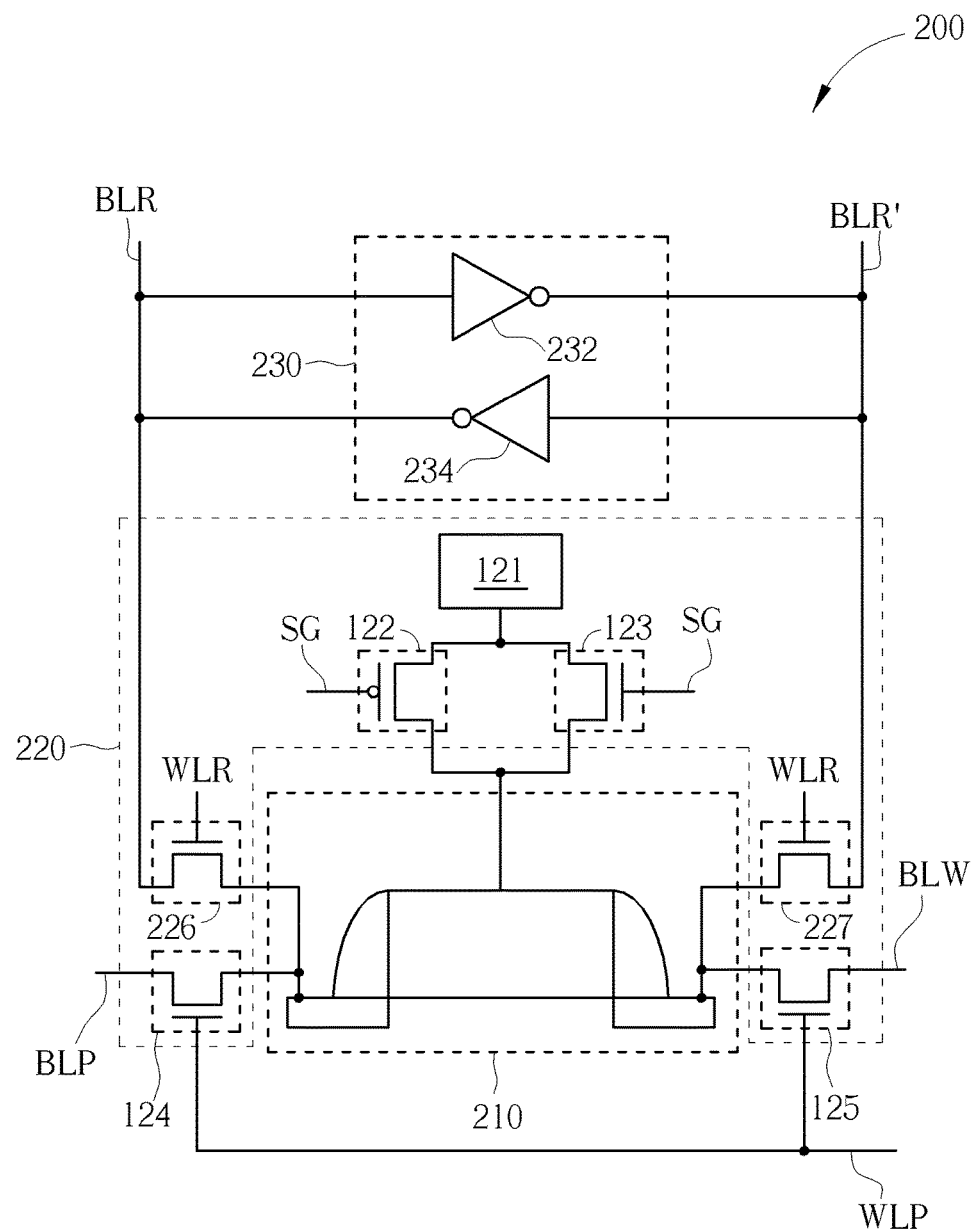
FIG. 4 shows a physically unclonable function unit according to another embodiment of the present invention.

FIG. 4 shows a PUF unit 200 according to another embodiment of the present invention. The PUF units 100 and 200 have similar structures and can be operated with similar principles. However, the control circuit 220 of the PUF unit 200 further includes a first read transistor 226 and a second read transistor 227.

The first read transistor 226 has a first terminal coupled to a first read bit line BLR, a second terminal coupled to the first terminal of the anti-fuse transistor 210, and a control terminal coupled to a read word line WLR. The second read transistor 227 has a first terminal coupled to a second read bit line BLR', a second terminal coupled to the second terminal of the anti-fuse transistor 210, and a control terminal coupled to the read word line WLR. In this case, the first inverter 232 and the second inverter 234 of the differential sensing circuit 230 are coupled to first terminal of the anti-fuse transistor 210 through the first read bit line BLR and the first read transistor 226. Also, the first inverter 232 and the second inverter 234 are coupled to second terminal of the anti-fuse transistor 210 through the second read bit line BLR' and the second read transistor 227.

The first read transistor 226 and the second read transistor 227 can be used to protect the differential sensing circuit 230 from being damaged during the enroll operation. For example, the voltages shown in FIG. 2 can be applied to the PUF unit 200 for the enroll operation with the read word line WLR at the low operational voltage VL. In this case, the first read transistor 226 and the second read transistor 227 will be turned off. Therefore, the differential sensing circuit 230 will not be disturbed by the currents generated during the enroll operation.

Also, the voltages shown in FIG. 3 can be applied to the PUF unit 200 for the read operation with the read word line WLR being changed from the high operational voltage VH to the low operational voltage VL. That is, after the enroll word line WLP is changed from the high operational voltage VH to the low operational voltage VL during the read operation, the voltage difference between the bit lines BLR and BLR' caused by the current generated from the anti-fuse transistor 110 will become stable. Therefore, the read word line WLR can be changed from the high operational voltage VH to the low operational voltage VL, turning off the first read transistor 226 and the second read transistor 227. Consequently, the bit lines BLR and BLR' will stop being charged, and the differential sensing circuit 230 will magnify the voltage difference and output the entropy bit by latching voltages at the bit lines BLR and BLR' accordingly.

Figure 5:
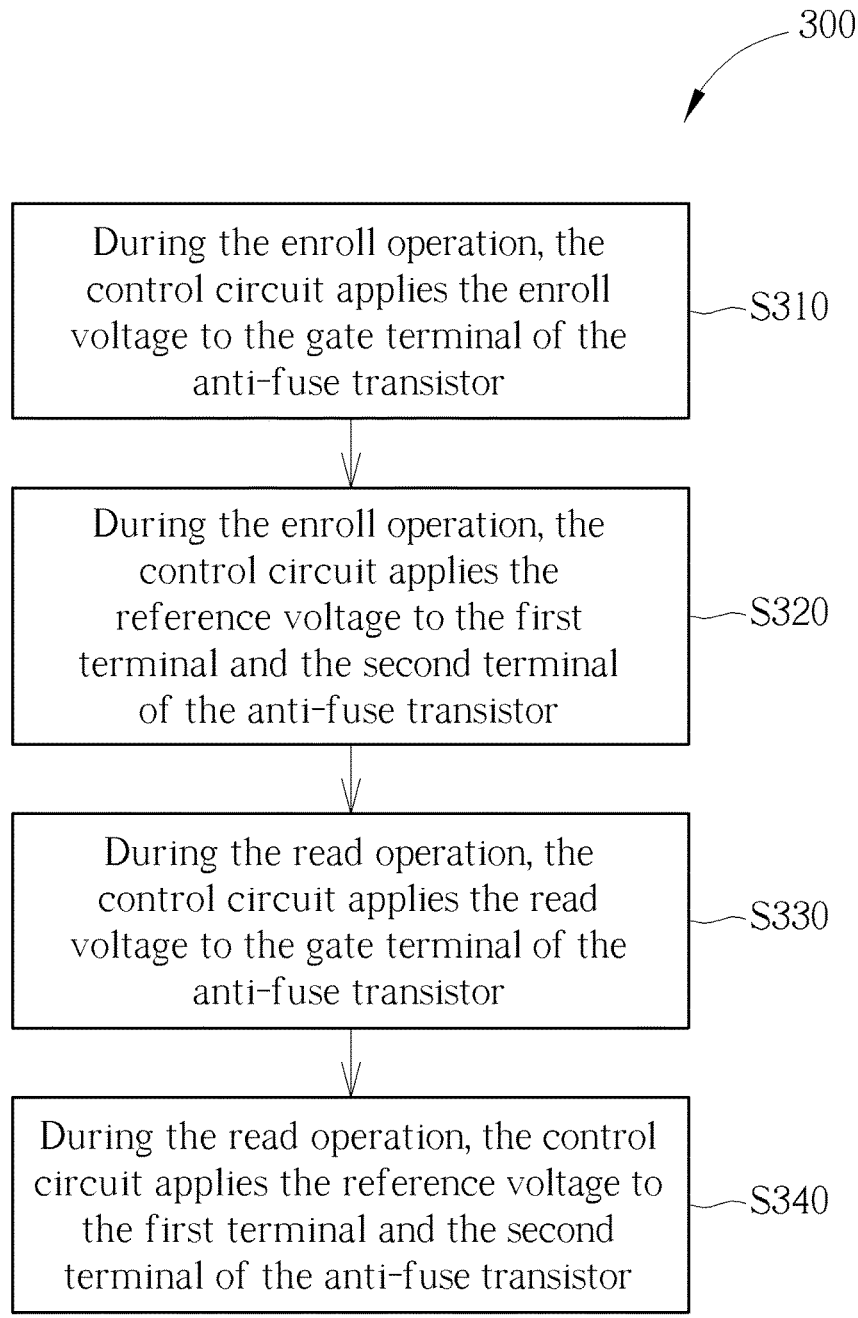
FIG. 5 shows a flow chart of a method for operating the PUF unit in FIG. 1.

FIG. 5 shows a flow chart of a method 300 for operating the PUF unit 100. The method 300 includes steps S310 to S340, but is not limited to the order shown in FIG. 5.

S310: during the enroll operation, the control circuit 120 applies the enroll voltage VP to the gate terminal of the anti-fuse transistor 110;

S320: during the enroll operation, the control circuit 120 applies the reference voltage V0 to the first terminal and the second terminal of the anti-fuse transistor 110;

S330: during the read operation, the control circuit 120 applies the read voltage VR to the gate terminal of the anti-fuse transistor 110;

S340: during the read operation, the control circuit 120 applies the reference voltage V0 to the first terminal and the second terminal of the anti-fuse transistor 110.

Since the voltage difference between the enroll voltage VP and the reference voltage V0 is very high, a rupture path on the gate terminal to the first terminal or to the second terminal of the anti-fuse transistor 110 will be created, and the anti-fuse transistor 110 can be enrolled in steps S310 and S320.

Later, during the read operation, in steps S330 and S340, the read voltage VR lower than the enroll voltage VP is applied to the gate terminal of the anti-fuse transistor 110, and the entropy bit can be read out according to the currents generating from the first terminal and the second terminal of the anti-fuse transistor 100.

With the method 300, the PUF unit 100 can be enrolled to generate the entropy bit with one single anti-fuse transistor 110, and the entropy bit stored in the anti-fuse transistor 110 can be read by the differential sensing circuit 130. In addition, the control circuit 120 can be implemented with different structures or with different elements, in some embodiments. For example, the control circuit 220 shown in FIG. 4 can also be used to control the anti-fuse transistor 210, and the method 300 can also be applied to the PUF unit 200.

In summary, the PUF units and the method for operating the PUF units provided by the embodiments of the present invention can generate the entropy bit with one single anti-fuse transistor. Since the entropy bits stored in the PUF unit are represented by the oxide condition of the anti-fuse transistor, the entropy bits can be saved in a safer way against the hacking approaches, such as voltage contrast inspection and gate scanning, used in prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A physically unclonable function (PUF) unit comprising:
   an anti-fuse transistor having a first terminal, a second terminal, and a gate terminal; and
   a control circuit coupled to the anti-fuse transistor and configured to apply an enroll voltage to the gate terminal of the anti-fuse transistor and apply a reference voltage to the first terminal and the second terminal of the anti-fuse transistor during an enroll operation;
   wherein the enroll voltage is higher than the reference voltage, and is high enough to create a rupture path on the gate terminal to the first terminal or to the second terminal.

2. The physically unclonable function unit of claim 1, further comprising a differential sensing circuit configured to output an entropy bit according to currents generating from the first terminal and the second terminal of the anti-fuse transistor during a read operation.

3. The physically unclonable function unit of claim 2, wherein the control circuit comprises:
a voltage source configure to provide the enroll voltage during the enroll operation and a read voltage lower than the enroll voltage during the read operation;
a P-type gate control transistor having a first terminal coupled to the voltage source, a second terminal coupled to the gate terminal of the anti-fuse transistor, and a control terminal coupled to a select gate line; and
an N-type gate control transistor having a first terminal coupled to the voltage source, a second terminal coupled to the gate terminal of the anti-fuse transistor, and a control terminal coupled to the select gate line.

4. The physically unclonable function unit of claim 3, wherein the control circuit further comprises:
a first enroll transistor having a first terminal coupled to the first terminal of the anti-fuse transistor, a second terminal coupled to an enroll bit line, and a control terminal coupled to an enroll word line; and
a second enroll transistor having a first terminal coupled to the second terminal of the anti-fuse transistor, a second terminal coupled to the enroll bit line, and a control terminal coupled to the enroll word line.

5. The physically unclonable function unit of claim 4, wherein:
during the enroll operation, the select gate line is at a low operational voltage lower than a high operational voltage, the enroll bit line is at the reference voltage, and the enroll word line is at the high operational voltage higher than the reference voltage and lower than the enroll voltage.

6. The physically unclonable function unit of claim 4, wherein the differential sensing circuit comprises:
a first inverter having an input terminal coupled to the first terminal of the anti-fuse transistor through a first read bit line, and an output terminal coupled to the second terminal of the anti-fuse transistor through a second read bit line; and
a second inverter having an input terminal coupled to the output terminal of the first inverter, and an output terminal coupled to the input terminal of the first inverter.

7. The physically unclonable function unit of claim 6, wherein:
during the read operation:
the select gate line is changed from a low operational voltage to a high operational voltage;
the enroll bit line is at the reference voltage; and
the enroll word line is changed from the high operational voltage to the low operational voltage.

8. The physically unclonable function unit of claim 7, wherein:
during the read operation, the select gate line is changed from the low operational voltage to the high operational voltage after the enroll word line is changed from the high operational voltage to the low operational voltage.

9. The physically unclonable function unit of claim 4, wherein the control circuit further comprises:
a first read transistor having a first terminal coupled to a first read bit line, a second terminal coupled to the first terminal of the anti-fuse transistor, and a control terminal coupled to a read word line; and
a second read transistor having a first terminal coupled to a second read bit line, a second terminal coupled to the second terminal of the anti-fuse transistor, and a control terminal coupled to the read word line.

10. The physically unclonable function unit of claim 9, wherein:
during the enroll operation, the select gate line is at a low operational voltage lower than a high operational voltage, the enroll bit line is at the reference voltage, the enroll word line is at the high operational voltage higher than the reference voltage and lower than the enroll voltage, and the read word line is at a low operational voltage.

11. The physically unclonable function unit of claim 9, wherein the differential sensing circuit comprises:
a first inverter having an input terminal coupled to the first read bit line, and an output terminal coupled to the second read bit line; and
a second inverter having an input terminal coupled to the output terminal of the first inverter, and an output terminal coupled to the input terminal of the first inverter.

12. The physically unclonable function unit of claim 11, wherein:
during the read operation:
the select gate line is changed from a low operational voltage to a high operational voltage;
the enroll bit line is at the reference voltage;
the enroll word line is changed from the high operational voltage to the low operational voltage; and
the read word line is changed from the high operational voltage to the low operational voltage.

13. The physically unclonable function unit of claim 12, wherein:
during the read operation, the select gate line is changed from the low operational voltage to the high operational voltage after the enroll word line is changed from the high operational voltage to the low operational voltage, and the read word line is changed from the high operational voltage to the low operational voltage after the enroll word line is changed from the high operational voltage to the low operational voltage.

14. A method for operating a physically unclonable function (PUF) unit, the PUF unit comprising an anti-fuse transistor and a control circuit coupled to the anti-fuse transistor, and the method comprising:
during an enroll operation:
the control circuit applying an enroll voltage to a gate terminal of the anti-fuse transistor; and
the control circuit applying a reference voltage to a first terminal and a second terminal of the anti-fuse transistor;
wherein the enroll voltage is higher than the reference voltage, and the enroll voltage is high enough to create a rupture path on the gate terminal to the first terminal or to the second terminal.

15. The method of claim 14, further comprising:
during a read operation,
the control circuit applying a read voltage to the gate terminal of the anti-fuse transistor; and
the control circuit applying a reference voltage to the first terminal and the second terminal of the anti-fuse transistor;
wherein the enroll voltage is higher than the read voltage, the read voltage is higher than the reference voltage.

* * * * *